United States Patent

[11] 3,628,551

[72] Inventors Endre A. Mayer
Birmingham, Mich.;
Donald E. Frericks, Bettendorf, Iowa

[21] Appl. No. 754
[22] Filed Jan. 5, 1970
[45] Patented Dec. 21, 1971
[73] Assignee The Bendix Corporation

[54] CONFINED JET AMPLIFIER HAVING A RECEIVER CHARACTERIZED BY HAVING A PLURALITY OF FLOW OPENINGS
10 Claims, 5 Drawing Figs.

[52] U.S. Cl. .......... 137/81.5
[51] Int. Cl. .......... F15c 1/04
[50] Field of Search .......... 137/81.5

[56] References Cited

UNITED STATES PATENTS

| | | | |
|---|---|---|---|
| 3,465,775 | 9/1969 | Rose | 137/81.5 |
| 3,469,592 | 9/1969 | Kuczkowski et al. | 137/81.5 |
| 3,489,009 | 1/1970 | Rimmer | 137/81.5 X |
| 3,500,846 | 3/1970 | Wood | 137/81.5 |
| 3,502,093 | 3/1970 | Leskiewicz | 137/81.5 |
| 3,508,564 | 4/1970 | Nelson | 137/81.5 |

*Primary Examiner*—Samuel Scott
*Attorneys*—William F. Thornton and Plante, Hartz, Smith & Thompson

ABSTRACT: A confined jet fluid pressure amplifier having a receiver comprising a plurality of openings to provide increased gain and reduced noise levels.

INVENTORS
Endre A. Mayer
Donald E. Frericks
BY
William F. Thornton
ATTORNEY.

CONFINED JET AMPLIFIER HAVING A RECEIVER CHARACTERIZED BY HAVING A PLURALITY OF FLOW OPENINGS

CROSS REFERENCE TO A RELATED PATENT

This invention relates to an improvement in the confined jet amplifier disclosed in the patent to E. A. Mayer, U.S. Pat. No. 3,468,329, issued Sept. 23, 1969.

BACKGROUND OF THE INVENTION

Field of the Invention

Fluidic devices, and more particularly, confined jet fluid pressure amplifiers.

Description of the Prior Art

The above-referenced patent to Mayer discloses a confined jet fluid pressure amplifier having an input tube for issuing a jet of supply fluid, an axially aligned receiver tube for receiving a portion of the supply fluid jet, a housing surrounding both the input tube and the receiver tube, and a valve or the like for varying the pressure inside of the housing which proportionally varies the amount of recovery of the supply jet pressure by the receiver tube. The receiver tube of the patent to Mayer has an unobstructed opening exposed to the supply jet.

The patent to Todd, U.S. Pat. No. 2,408,705, discloses an open jet amplifier having an input tube issuing a jet of supply fluid and a generally axially aligned receiver tube. The receiver tube of the patent to Todd has a wire mesh positioned in the receiver opening. The Todd device is not a confined jet amplifier since there is no housing enclosing the input tube and the receiver tube so as to provide a chamber in which the pressure is controlled to vary the pressure recovery at the receiver in direct proportion thereto. Rather, control of pressure recovery is provided by a deflecting control jet in inverse proportion to control pressure. Importantly, the patent to Todd states that the screen provides a reduction in gain.

SUMMARY OF THE INVENTION

The present invention provides a confined jet fluid pressure amplifier having a receiver characterized by having a plurality of flow openings to provide an increase in gain and reduction in noise levels. The plurality of openings in the receiver can be provided by positioning a plate in the bore of the receiver tube having a number of small holes formed therein, or by positioning a mesh or screen material in the bore of the receiver tube.

The expected result of placing a restriction such as a plate having a plurality of holes, or of a wire mesh in a receiver opening would be a reduction in gain (pressure amplification), and an increase in noise due to the turbulence caused by the restriction. Actual usage of a confined jet amplifier with a receiver according to the present invention has demonstrated that gain is increased many-fold and noise levels have dropped significantly.

DETAILED DESCRIPTION OF THE PREFERRED EMBODIMENT

Figures 1, 2, 3, 4, 5:
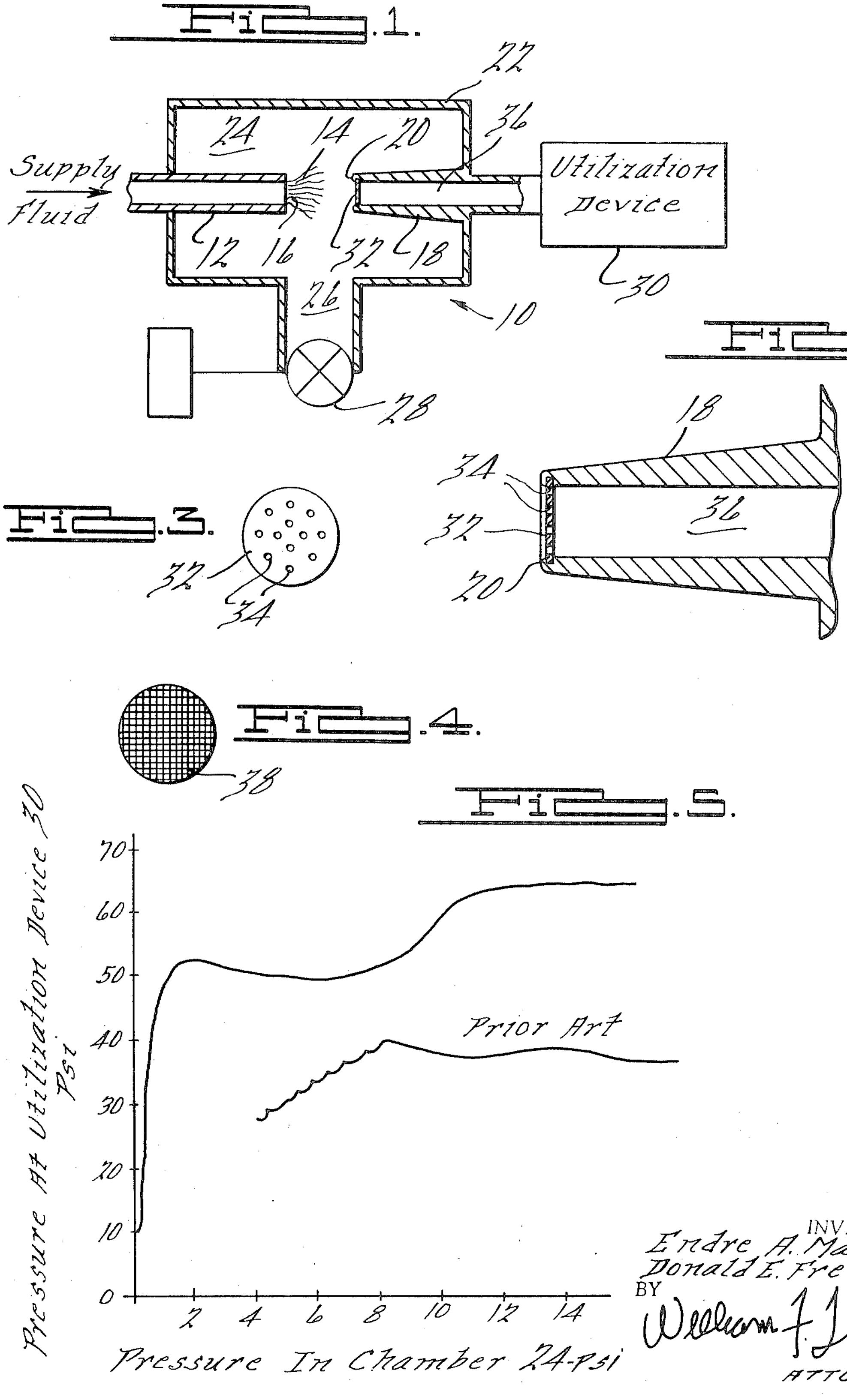
FIG. 1 is a cross-sectional view of a confined jet amplifier having a receiver according to the present invention.
FIG. 2 is a detailed cross-sectional view of the receiver of this invention which is shown in the confined jet amplifier of FIG. 1.
FIG. 3 is a detailed view of a plate having a plurality of holes formed therein which is used in the receiver of FIG. 2.
FIG. 4 is a view of a mesh material which may be used in place of the plate shown in FIG. 2.
FIG. 5 is a chart illustrating the gain of the confined jet amplifier of FIG. 1 in comparison with the gain of a typical prior art confined jet amplifier.

In FIG. 1, a confined jet amplifier 10 according to this invention is shown. The confined jet amplifier 10 comprises an input or supply tube 12 which is connected to a source of supply fluid (not shown), so as to issue a jet 14 of supply fluid from its opening 16. A receiver tube 18 is provided having an end 20 which is axially spaced from, an aligned with, the opening 16 of the supply tube 12.

The confined jet amplifier 10 is provided with a housing 22 surrounding the supply tube 12 and the receiver tube 18 such that each of the tubes 12 and 18 extend into a chamber 24 provided by the housing 22. The housing 22 is provided with an opening 26 having a valve 28 for controlling the pressure within the chamber 24.

8. The fluid device of claim 5 wherein said means for varying the pressure in the chamber comprises an outlet for the housing and a variable value in the outlet to control the amount of fluid being exhausted from the housing.

A utilization device 30 is connected to the receiver tube 18 to receive and respond to the pressure recovered by the receiver tube 18.

According to this invention, the receiver tube 18 is provided with a plate 32 having a plurality of holes 34 which is fixed within the bore of the receiver tube 18 near the end 20. The plate 32 provides a plurality of openings for flow of the supply jet 14 into the interior 36 of the receiver tube 18. This construction can be more clearly seen in the detailed view of the receiver tube 18 in FIG. 2, and the detailed view of the receiver tube plate 32 in FIG. 3. As an alternative, a wire mesh element 38 as shown in FIG. 4, may be used in place of the late 32.

In the construction of the receiver tube 18, it has been found to be convenient to provide a recess at the end 20 of the receiver tube 18 and to position the plate 32 (or the wire mesh element 38) in the recess. Thereafter, the edge of the tube is rolled over onto the plate 32 (or the wire mesh element 38) to fix the plate 32 to the end of the receiver tube 18 as shown in FIG. 2.

In an operating embodiment of a confined jet amplifier having a receiver according to this invention, a supply tube 12 having an inside diameter of 0.026 inches which extended into a chamber 0.0 inches was used in combination with a receiver tube 18 having an inside diameter of 0.030 inches which extended into the chamber 0.21 inches. The receiver tube 18 had an end plate 32 of approximately 0.0025-inches thickness with 14 holes, each having the diameter of 0.004 inches, distributed as shown in FIG. 3. The chamber 24 had a length of 0.25 inches and a diameter of 0.31 inches. Atmospheric air at 70 p.s.i. was used as the supply of fluid.

OPERATION

In the operation of the confined jet amplifier disclosed herein, a source of gas is connected to the supply tube 12 so as to issue a fluid stream 14 from the opening 16 which is directed at the end 20 of the receiver tube 18. The pressure in the chamber 24 is varied by adjusting the housing valve 28 so as to control the flow of fluid from the chamber 24. A variation of the chamber pressure varies the pressure received in the interior 36 of the receiver tube 18 in direct proportion thereto, and accordingly, varies the pressure received by the utilization device 30.

The relationship between the pressure in the chamber 24 and the pressure received by the utilization device 30 may be more clearly seen with reference to the chart of FIG. 5 which was constructed through testing the amplifier which is dimensionally described above. Particularly, as the pressure in the chamber increased from 0.5 to approximately 1.5 p.s.i., a very rapid and substantially linear increase in the pressure received by the utilization device 30 from 10 to 50 p.s.i. was experienced. The measured gain of the amplifier was approximately 150 in that region. Above approximately 2 p.s.i., chamber pressure, "hard limiting" occurs which is highly desirable in some circuit applications.

To provide easy comparison between the performance of the confined jet amplifier having a receiver of this invention with a confined jet amplifier having a conventional receiver, a second chart is provided showing the reduced gain achieved by the prior art devices. Moreover, the roughness of the curve in the linear zone indicates a high level of noise.

In view of the above description of the operation of this device, it will be appreciated that the confined jet amplifier receiver of this invention is an important advance in the art. Moreover, it is of simple and inexpensive construction, and is highly durable in use.

While we have described two preferred embodiments of the present invention it should be understood that various changes, adaptions and modifications may be made therein without departing from the spirit of the invention and the scope of the appending claims.

Having thus described our invention, we claim:

1. A fluid device comprising:
- a housing providing a chamber;
- supply opening means adapted to be connected to a source of supply fluid for issuing a jet of supply fluid into the chamber;
- means separate from said supply opening means for varying the pressure in the chamber; and
- receiver means spaced from, and generally aligned with said supply jet of fluid including a passage having a restriction therein having a plurality of openings therethrough for recovering at least a portion of the pressure of said supply jet of fluid;
- the recovery of pressure from said supply jet of fluid being direct proportion to the pressure within said chamber.

2. The fluid device of claim 1 wherein said receiver means passage restriction comprises a member disposed in said passage with a plurality of holes formed therein providing said plurality of openings.

3. The fluid device of claim 1 wherein said received means passage restriction comprises a screen mesh providing said plurality of openings.

4. The fluid device of claim 1 wherein said means for varying the pressure in the chamber comprises an outlet for the housing and a variable valve in the outlet to control the amount of fluid being exhausted from the housing.

5. A fluid device as recited in claim 1 wherein said receiver means passage comprises a tube extending through the housing and into the chamber with an end in alignment with said supply jet of fluid having said restriction therein with said plurality of openings.

6. The fluid device of claim 5 wherein said receiver means passage restriction comprises a member disposed in said passage with a plurality of holes formed therein providing said plurality of openings.

7. The fluid device of claim 5 wherein said receiver means passage restriction comprises a screen mesh providing said plurality of openings.

9. The fluid device of claim 8 wherein said receiver means passage restriction comprises a member with a plurality of holes formed therein providing said plurality of openings.

10. The fluid device of claim 8 wherein said receiver means passage restriction comprises a screen mesh providing said plurality of openings.

* * * * *